(12) United States Patent
Tucci

(10) Patent No.: US 6,456,994 B1
(45) Date of Patent: Sep. 24, 2002

(54) COMPUTER FOR A QUANTUM COMPUTER

(76) Inventor: Robert Tucci, P.O. Box 226, Bedford, MA (US) 01730

( * ) Notice: Subject to any disclaimer, the term of this patent is extended or adjusted under 35 U.S.C. 154(b) by 0 days.

(21) Appl. No.: 09/073,132

(22) Filed: May 5, 1998

(51) Int. Cl.$^7$ .............................................. G06N 3/04
(52) U.S. Cl. ......................................................... 706/52
(58) Field of Search ........................................... 706/52

(56) References Cited

U.S. PATENT DOCUMENTS 5,787,236 A   7/1998  Tucci

OTHER PUBLICATIONS

Gilbert Strang, Linear Algebra and Its Applications: Third Edition, 31–39, 195–206, 236–38, 1988.*
Barrenco et al., Elementary Gates for Quantum Computation, Physical Review A 52, 3457, 1988.*
Bennett et al., Teleporting an Unknown Quantum State via Dual Classical and EPR Channels, Physical Review Letters 70, 1895.*
Brassard, Teleportation as a Quantum Computation, Los Alamos eprint http://xxx.lanl.gov/abs/quant–ph/9605035.*
DiVincenzo, Quantum Computation, Science 270, 255, 1995.*
Flamig, Practical Algorithms in C++, 369–71, 1995.*
Murnaghan, The Orthogonal and Symplectic Groups, Institute for Advanced Studies, Dublin 12–16, 1958.*
Paige et al., History and Generality of the CS Decomposition, Linear Algebra and Its Applications 208, 303, 1994.*
Reck et al., Experimental Realization of Any Discrete Operator, Physical Review Letters 73, 58, 1994.*
Tucci, Quantum Bayesian Nets, Int. Jour. of Mod. Physics B9, 295, 1995.*

A Barenco et al. Elementary Gates for Quantum Computation, Phys. Review A52, 3457 (1995).
Brassard Teleportation as Quantum Computation Los Alamos preprint http://xxx.lanl.gov/abs/quant–ph/9605035 (1996).
A. M. Steane, "Quantum Computing" (1997), Los Alamos eprint http:/xxx.lanl.gov/abs/quant–ph/9708022.
Robert R. Tucci, "A Quantum Compiler", Disclosure Document 431118 (1998).
Robert R. Tucci, "A Rudimentary Quantum Compiler" Disclosure Document 433559 (1998).
Robert R. Tucci, "A Rudimentary Quantum Compiler" (1998) Los Alamos eprint http://xxx.lanl.gov/abs/quant–ph 9805015.
Robert R. Tucci, "How to Compile a Quantum Bayerian Net" Los Alamos eprint http://xxx.lanl.gov/abs/quant–ph 9805016.
Robert R. Tucci, "Quantum Fog Library of Essays" (vers.1.0) 1997.

* cited by examiner

Primary Examiner—Mark R. Powell
Assistant Examiner—Wilbert L. Starks, Jr.

(57) ABSTRACT

A quantum computer is an array of quantum hits (qubits) together with some hard-ware for manipulating these qubits. Quantum Bayesian (QB) nets are a method of modeling quantum systems graphically in terms of network diagrams. This invention comprises a classical computer running a Computer program that expresses the information contained in a QB net as a sequence of elementary operations (SEO). One can then run these sequences on a quantum computer. We show how to reduce a QB net into a SEO by a two step process. First, express the information contained in the QB net as a sequence of unitary operators. Second, express each of those unitary operators as a SEO. An appendix to this document contains the C++ source code of a computer program called "Qubiter1.0", which is a preferred embodiment of the invention.

37 Claims, 11 Drawing Sheets

Figure 8

```
81 ──── //number of bits
82 ──── 2
83 ──── //matrix U, as a string of columns
        0.5      0
        0.5      0
        0.5      0
        0.5      0
        0.5      0
        0        0.5
        -0.5     0
        0        -0.5
84      0.5      0
        -0.5     0
        0.5      0
        -0.5     0
        0.5      0
        0        -0.5
        -0.5     0
        0        0.5
```

Figure 9

```
91 ─ 2
    ROTZ 0    292.500000
    ROTZ 1    45.0000000
    CNOT 1    T    0
    ROTZ 0    315.000000
    CNOT 1    T    0
    ROTY 0    315.000000
    CNOT 1    T    0
    ROTY 0    0.00000000
    CNOT 1    T    0
    ROTZ 0    337.500000
    ROTZ 1    0.00000000
    CNOT 1    T    0
    ROTZ 0    45.0000000
    CNOT 1    T    0
    ROTY 1    315.000000
92  CNOT 0    T    1
    ROTY 1    22.5000000
    CNOT 0    T    1
    ROTZ 0    247.500000
    ROTZ 1    45.0000000
    CNOT 1    T    0
    ROTZ 0    315.000000
    CNOT 1    T    0
    ROTY 0    315.000000
    CNOT 1    T    0
    ROTY 0    0.00000000
    CNOT 1    T    0
    ROTZ 0    22.5000000
    ROTZ 1    0.00000000
    CNOT 1    T    0
    ROTZ 0    315.000000
    CNOT 1    T    0
    PHAS 157.500000
```

Figure 10

```
2
ROTZ 0      292.500000
ROTZ 1      45.0000000
CNOT 1    T      0
ROTZ 0      315.000000
CNOT 1    T      0
ROTY 0      315.000000
ROTZ 0      337.500000
CNOT 1    T      0
ROTZ 0      45.0000000
CNOT 1    T      0
ROTY 1      315.000000
CNOT 0    T      1
ROTY 1      22.5000000
CNOT 0    T      1
ROTZ 0      247.500000
ROTZ 1      45.0000000
CNOT 1    T      0
ROTZ 0      315.000000
CNOT 1    T      0
ROTY 0      315.000000
ROTZ 0      22.5000000
CNOT 1    T      0
ROTZ 0      315.000000
CNOT 1    T      0
PHAS 157.500000
```

Figure 11

```
111 ——— //matrix name?
112 ——— DiscFourier2bit
113 ——— //Do compilation?(yes, no)
114 ——— yes
115 ——— //Do decompilation?(yes, no)
116 ——— yes
117 ——— //Do zero angle optimization?(yes, no)
118 ——— yes
```

COMPUTER FOR A QUANTUM COMPUTER

TECHNICAL FIELD

The invention relates to an array of quantum bits known as a quantum computer. More specifically, it relates to the generation of the instruction sequences that are used to manipulate such an array.

BACKGROUND OF THE INVENTION

This invention deals with quantum computers. A quantum computer is an array of quantum bits (qubits) together with sonic hardware for manipulating these qubits. Quantum computers with only a few bits have already been built. For a review of quantum computers, see DiV95: D. P. DiVincenzo. Science 270, 255 (1995). See also Ste97:A. M. Steane, Los Alamos eprint http://xxx.lanl.gov/abs/quant-ph/9708022.

This invention also deals with Quantum Bayesian (QB) nets. QB Nets are a method of modeling quantum systems graphically in terms of network diagrams. For more information, see Tuc95: R. R. Tucci. Int. Jour. of Mod. Physics B9, 295 (1995). See also Tuc98: U.S. Pat. No. 5,787,236.

In classical computation and digital electronics, one deals with sequences of elementary instructions (instructions such as AND, NOT and OR). These sequences are used to manipulate an array of classical bits. The instructions are elementary in the sense that they act on only a few bits (usually 1, 2 or 3) at a time. Henceforth, we will sometimes refer to sequences as products and to instructions as operations, operators, steps or gates. Furthermore, we will abbreviate the phrase "sequence of elementary operations" by "SEO". In quantum computation, one also deals with SEOs, but for manipulating qubits instead of classical bits.

This invention comprises a classical computer running a computer program that expresses the information contained in a QB net as a SEO. One can then run these SEOs on a quantum computer. Of course, QB nets can and have been run entirely on a classical computer. (See the software program called "Quantum Fog", produced by the Artiste company (www.ar-tiste.com)). However, because of the higher speeds promised by quantum parallelism, one expects QB nets to run much faster on a quantum computer.

With classical computers, one usually writes a computer program in a high level language (like Fortran, C or C++). A compiler then expresses this as a SEO for manipulating bits. In the case of quantum computers, a QB net may be thought of as a program in a high level language. This invention is like a "quantum compiler" in the sense that it can take a QB net input, and re-express it as a SEO that can then be used to manipulate qubits.

This invention shows how to reduce a QB net into a SEO by a two step process. First, express the information contained in the QB net as a sequence of unitary operators. Second, express each of those unitary operators as a SEO. An appendix to this document contains the C++ source code of a computer program called "Qubiter.1.0". In its current version (1.0), Qubiter can decompose into a SEO only the simplest non-trivial kind of QB net: a single unitary matrix, or, equivalently. 2 connected nodes. Future versions of Qubiter are planned that will take an arbitrary QB net as input, and return as output a SEO for running a quantum computer.

QB nets are to quantum physics what Classical Bayesian (CB) nets are to classical physics. For a review of CB nets, see Nea9O: Richard E. Neapolitan, *Probabilistic Reasoning in Expert Systems: Theory and Algorithms* (Wiley, 1990). See also Pea88: Judea Pearl, *Probabilistic Reasoning in Intelligent Systems: Networks of Plausible Inference* (Morgan Kaufmann, Palo Alto, 1988). CB nets have been used very successfully in the field of artificial intelligence (AI). Thus, we hope and expect that some day QB nets, running on quantum computers, will be used for AI applications. In fact, we believe that quantum computers are ideally suited for such applications. First, because AI tasks often require tremendous power, and quantum computers seem to promise this. Second, because (quantum computers are plagued by quantum noise, which makes their coherence times short. There are palliatives to this, such as quantum error correction (See the review Ste97). But such palliatives come at a price: a large increase in the number of steps. The current literature often mentions factoring a large number into primes as a future use of quantum computers (See the review Ste97). However, due to noise, quantum computers may ultimately prove to be impractical for doing long precise calculations such as this. On the other hand, short coherence times appear to be a less serious problem for the types of calculations involved in AI. The human brain has coherence times too short to factor a 100 digit number into primes, and yet long enough to conceive the frescoes in the Sistine Chapel. We do not mean to imply that the human brain is a quantum computer. An airplane is not a bird, but it makes a good flyer. Perhaps a quantum computer, although not a human brain, can make a good thinker.

To our knowledge, nobody else has invented a method of reducing an arbitrary QB net to a SEO for running a quantum computer. It's true that previous workers (See Bar95: A. Barrenco, C. H. Bennett, R. Cleve, D. P. DiVincenzo, N. Margolus, P. Shor, T. Sleator, J. H. Smolin, H. Weinfurter, Physical Review A 52, 3457 (1995)) have described a method for reducing a single unitary operator into a SEO. But our method for doing this is significantly different from theirs. Their method is based on a mathematical technique described in Rec94: M. Reck and A. Zeilinger, Physical Review Letters 73, 58 (1994). Our method is based on a mathematical technique called the CS Decomposition, to be described later. For a review of the CS decomposition, see Pai94: C. C. Paige, M. Wei, Linear Algebra And Its Applications 208, 303 (1994). Our CS method for reducing unitary matrices has inherent binary symmetries that make it easy to apply to qubit systems, which also possess binary symmetries. The method of Bar95 possesses no such symmetries. For this reason, we believe our method to be superior to theirs.

GOALS OF THE INVENTION

The main goal of the invention is to provide a new method for generating the SEOs that are used to manipulate a quantum computer. This goal is achieved by means of a classical computer running a computer program that takes as input a QB net, and returns as output the desired SEO.

A related goal of the invention is for said computer program to serve as a blueprint that future workers can modify and enlarge.

A related goal is to allow users to run QB nets on a (quantum instead of a classical computer. The QB nets could be used, for example, to do AI tasks such as decision making.

SUMMARY OF THE INVENTION

A quantum computer is an array of quantum bits (qubits) together with some method for manipulating these qubits.

Quantum Bayesian (QB) nets are a method of modeling quantum systems graphically in terms of network diagrams.

This invention comprises a classical computer that runs a computer program. The program takes a QB net and decomposes it into a sequence of elementary operations (SEO). Such a sequence can be used to manipulate a quantum computer.

This invention shows how to reduce a QB net into a SEO by performing four steps: (1) Find eras. (2) Insert delta functions. (3) Find unitary extensions of era matrices. (4) Decompose each unitary matrix into a SEO.

In step (1), we partition the set of nodes of the QB net into subsets called eras. All nodes in a given era "occur at roughly the same time". We also assign a matrix to each era.

In step (2), we pad the era matrices of step (1) with delta functions so that the resultant era matrices can be multiplied by each other.

In step (3), we extend the era matrices of step (2) (by adding rows and columns) so that the resultant era matrices are all unitary and of the same size.

In step (4), we reduce into a SEO each of the unitary era matrices of step (3). Step (4) is based on the CS Decomposition Theorem. This theorem asserts that: given a unitary matrix U, if we partition it into 4 blocks $U_0$, $U_1$, $U_2$, $U_3$ of the same size, then one can express each $U_k$, k where k∈{0, 1, 2, 3}, as a product $L_k D_k R_k$, such that $L_k$ and $R_k$ are unitary matrices and $D_k$ is diagonal. Since the matrices $L_k$ and $R_k$ are unitary one can apply the CS Decomposition Theorem to them next. One can continue to apply the CS Decomposition Theorem to the unitary matrices generated in previous steps. In this way, one can express the original matrix U as a product of matrices of a type that we call "central matrices". We show how to express any central matrix as a SEO.

An appendix to this document contains the C++ source code of a computer program called "Qubiter1.0". In its current version (1.0), Qubiter can decompose into a SEO only the simplest non-trivial kind of QB net: a single unitary matrix, or, equivalently, 2 connected nodes. Future versions of Qubiter are planned that will take an arbitrary QB net as input, and return as output a SEO for running a quantum computer.

BRIEF DESCRIPTION OF THE DRAWINGS

FIG. 8 shows a file listing the entries of a unitary matrix. Such files are called "mat.in", where the string "mat" is a variable specified by the user.

FIG. 9 shows a file listing a SEO. Such files are called "mat-cmnd.out", where the string "mat" is a variable specified by the user. The SEO in this figure is a decomposition of the matrix specified by FIG. 8.

FIG. 10 shows another file listing a SEO. This SEO can be obtained from that in FIG. 9 by deleting from the latter those factors arising from rotations by a zero angle.

FIG. 11 shows the first file that Qubiter looks for. It's called "qbtr-params.in", and it determines the name of other input files that Qubiter may look for. It also determines the mode of operation of Qubiter.

DETAILED DESCRIPTION OF THE INVENTION (A) NEW METHOD

We begin by presenting a brief review of QB nets. For more information, see Tuc95, Tuc98.

In what follows, we use the following notation. We define $Z_{a,b}=\{a, a+1, a+2, \ldots, b\}$ for any integers a and b, $\delta(x,y)$ equals one if x=y and zero otherwise. For any finite set S, $|S|$ denotes the number of elements in S.

We call a graph (or a diagram) a collection of nodes with arrows connecting some pairs of these nodes. The arrows of the graph must satisfy certain constraints. We call a labelled graph a graph whose nodes are labelled. A QB net consists of two parts: a labelled graph with each node labelled by a random variable, and a collection of node matrices, one matrix for each node. These two parts must satisfy certain constraints.

An internal arrow is an arrow that has a starting (source) node and a different ending (destination) one. We will use only internal arrows. We define two types of nodes: an internal node is a node that has one or more internal arrows leaving it, and an external node is a node that has no internal arrows leaving it. It is also common to use the terms root node or prior probability node for a node which has no incoming arrows (if any arrows touch it, they are outgoing ones).

We restrict our attention to acyclic graphs: that is, graphs that do not contain cycles. (A cycle is a closed path of arrows with the arrows all pointing in the same sense.)

We assign a random variable to each node of the QB net. (Henceforth, we will underline or put a caret over random variables. For example, we might write $P(\hat{x}=x)$ for the probability that the random variable $\hat{x}$ assumes the particular value x.) Suppose the random variables assigned to the N nodes are $\hat{x}_1, \hat{x}_2, \ldots, \hat{x}_N$. For each $j \in Z_{1,N}$, the random variable $\hat{x}_j$ will be assumed to take on values within a finite set $\Sigma_j$ called the set of possible states of $\hat{x}_j$.

Figure 1:
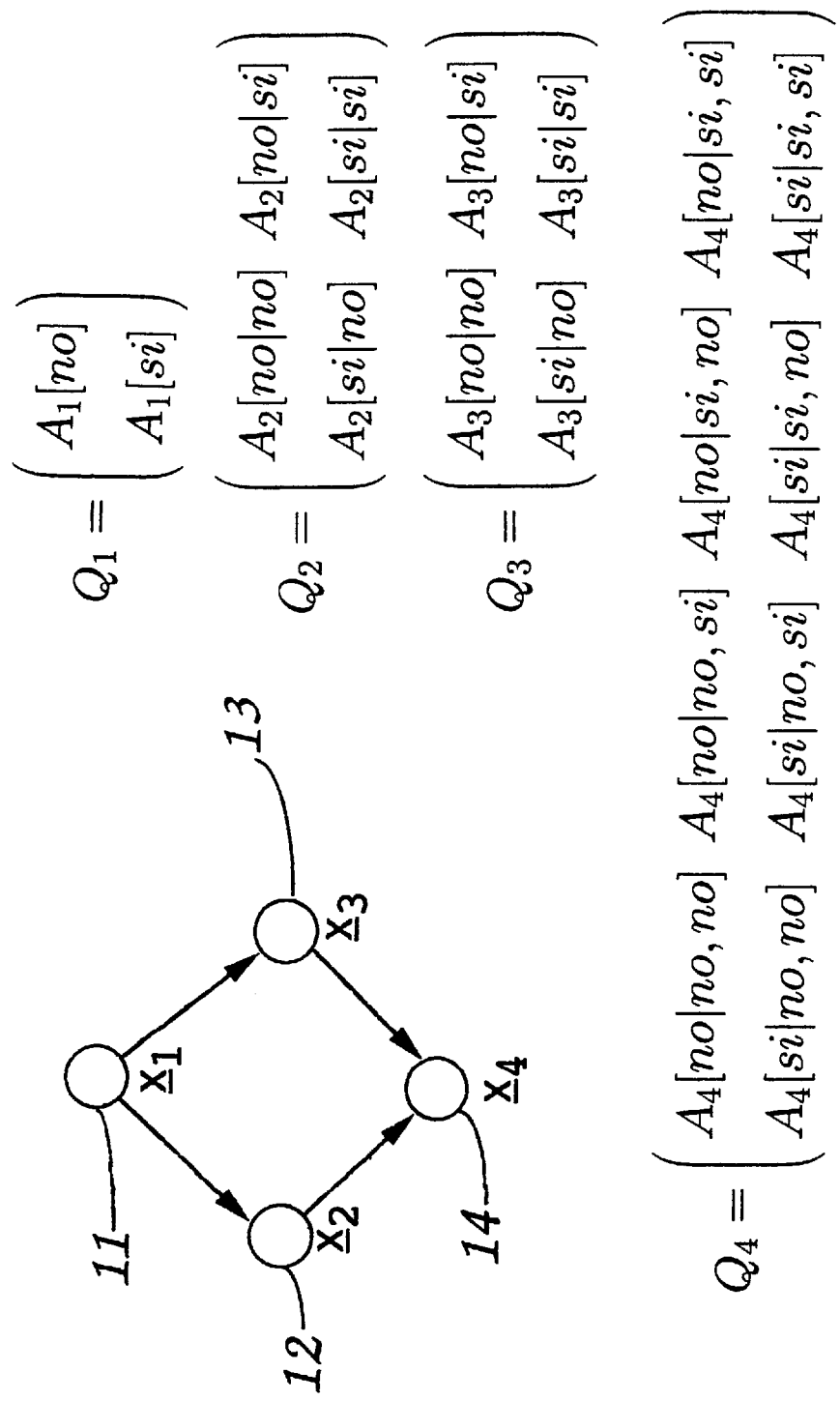
FIG. 1 shows a labelled graph and the four node matrices associated with the four nodes of the graph. A QB net consists of 2 parts: a labelled graph and a collection of node matrices, one matrix for each node.

For example, consider the net of FIG. 1. Nodes 11, 12 and 13 are internal and node 14 is external. Node 11 is a root node. There are four nodes so N=4. We will assume that the four nodes must lie in one of two states: either no or si. Thus, $\Sigma_1=\Sigma_2=\Sigma_3=\Sigma_4=\{no, si\}$.

If $S=\{k_1, k_2, \ldots, k_{|S|}\} \subset Z_{1,N}$, and $k_1<k_2<\ldots<K_{|S|}$, define $(x.)_S=(x_{k_1}, x_{k_2}, \ldots, x_{k_{|S|}})$ and $(\hat{x}.)_S=(x_{k_1}, \hat{x}_{k_2}, \ldots, \hat{x}_{k_{|S|}})$. Sometimes, we also abbreviate $(x.)_{Z_{1,N}}$ (i.e., the vector that includes all the possible $x_j$ components) by just x., and $(\hat{x}.)Z_{1,N}$ by just $\hat{x}$..

For example, suppose N=4. One has $Z_{1,4}=\{1,2,3,4\}$. If $S=\{1,3\}$, then $|S|=2$. Furthermore, $(x.)_S=(x_1, x_3)$ and $(\hat{x}.)_S=(\hat{x}_1, \hat{x}_3)$. One defines $x.=(x.)Z_{1,4}=(x_1, x_2, x_3, x_4)$ and $\hat{x}.=(\hat{x}.)Z_{1,4}=(\hat{x}_1, \hat{x}_2, \hat{x}_3, \hat{x}_4)$.

Let $Z_{ext}$ be the set of all $j \in Z_{1,N}$ such that $\hat{x}_j$ is an external node, and let $Z_{int}$ be the set of all $j \in Z_{1,N}$ such that $\hat{x}_j$ is an internal node. Clearly, $Z_{ext}$ and $Z_{int}$ are disjoint and their union is $Z_{1,N}$.

For example, for FIG. 1, $Z_{ext}=\{4\}$ and $Z_{int}=\{1,2,3\}$.

Each possible value x. of $\hat{x}$. defines a different net story. For any net story x., we call (x.)$Z_{int}$ the internal state of the story and (x.)$Z_{ext}$ its external state.

For example, a possible story for the net of FIG. 1 is the case when $\hat{x}_1=\hat{x}_2=$si and $\hat{x}_3=\hat{x}_4=$no. This net story may also be represented by $\hat{x}.=$(si, si, no, no). Since we are assuming that each of the four nodes of FIG. 1 can assume two states, there are total of $2^4=16$ stories possible for the net of FIG. 1. For story $\hat{x}.=$(si,si,no,no), the internal state is $(x_1,x_2,x_3)=$ (si,si,no) and the external state is $x_4=$no.

For each net story, we may assign an amplitude to each node. Define $S_j$ to be the set of all k such that an arrow labelled $x_k$ (i.e., an arrow whose source node is $\hat{x}_k$) enters node $\hat{x}_j$. We assign a complex number $A_j[x_j|(x.)_{S_j}]$ to node $\hat{x}_j$. We call $A_j[x_j|(x.)_{S_j}]$ the amplitude of node $\hat{x}_j$ within net story x..

For example, consider a particular net story, call it $(x_1, x_2, x_3, x_4)$, of FIG. 1. No arrow enters node $\hat{x}_1$ so both $S_1$ and (x.)$_{S_1}$ are empty. Node $\hat{x}_2$ is entered by an arrow from node $\hat{x}_1$ so $S_2=\{1\}$ and (x.)$_{S_2}=(x_1)$. Likewise, $S_3=\{1\}$ and (x.)$_{S_3}=(x_1)$. Finally, $S_4=\{2,3\}$ and (x.)$_{S_4}=(x_2,x_3)$. We assign the complex number $A_1[x_1]$ to node $\hat{x}_1$, $A_2[x_2|x_1]$ to node $\hat{x}_2$, $A_3[x_3|x_1]$ to node $\hat{x}_3$, and $A_4[x_4|x_2,x_3]$ to node $\hat{x}_4$.

The amplitude of net story x., call it A(x.), is defined to be the product of all the node amplitudes $A_j[x_j|(x.)_{S_j}]$ for $j \in Z_{1,N}$. Thus, $$A(x.) = \prod_{j \in Z_{1,N}} A_j[x_j \mid (x.)s_j]. \tag{1}$$

For example, consider a particular net story, call it $(x_1, x_2, x_3, x_4)$, of FIG. 1. One has that $$A(x_1,x_2,x_3,x_4)=A_1[x_1]A_2[x_2|x_1]A_3[x_3|x_1]A_4[x_4|x_2,x_3] \tag{2}$$

The function $A_j$ with values $A_j[x_j|(x.)_{S_j}]$ determines a matrix that we will call the node matrix of node $\hat{x}_j$, and denote by $Q_j$. Thus, $x_j$ is the matrix's row index and (x.)$_{S_j}$ is its column index.

For example, FIG. 1 gives the four node matrices $Q_1, Q_2, Q_3, Q_4$ associated with the four nodes of the graph shown there.

Figure 2:
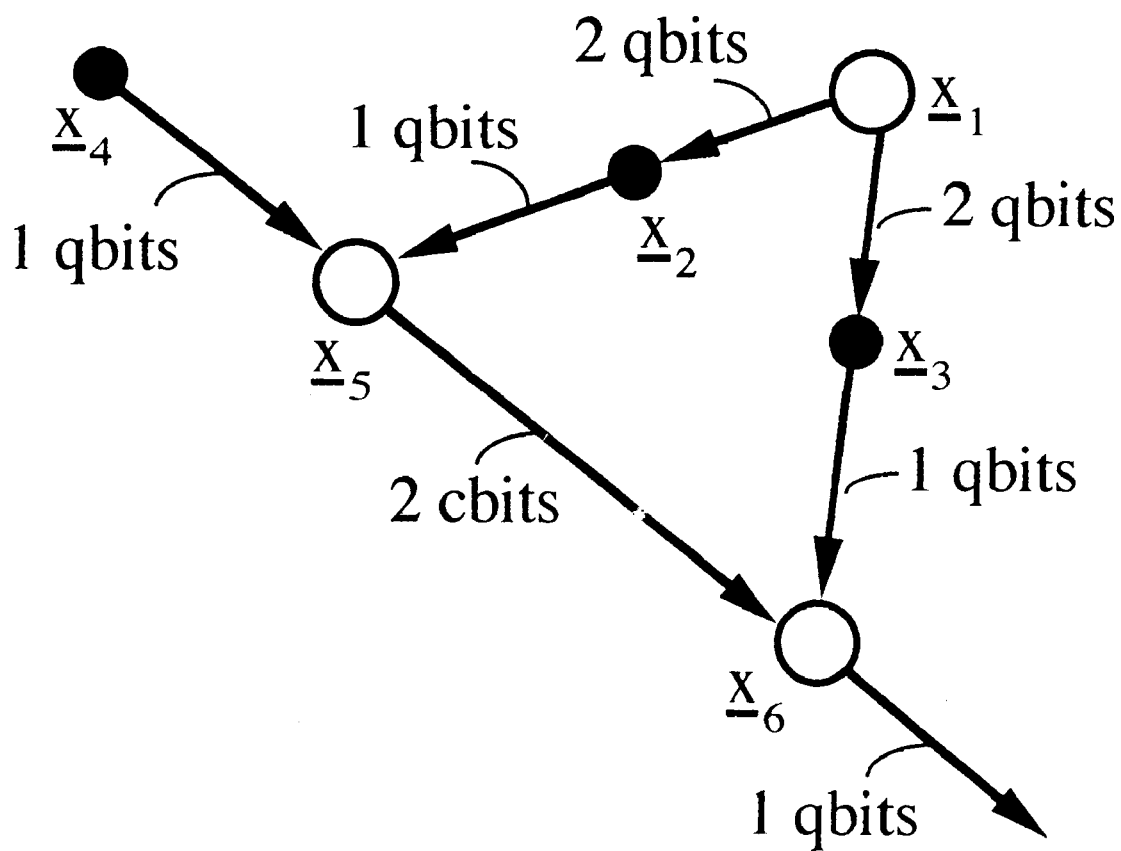
FIG. 2 shows a QB Net for Teleportation. This figure also shows the number of quantum or classical bits carried by each arrow.

One can translate a QB net into a SEO by performing 4 steps: (1) Find eras. (2) Insert delta functions. (3) Find unitary extensions of era matrices. (4) Decompose each unitary matrix into a SEO. Next we will discuss these 4 steps in detail. We will illustrate our discussion by using Teleportation as an example. Teleportation was first discussed in Tel93: C. H. Bennett, G. Brassard, C. Crépeau, R. Jozsa, A. Peres, W. K. Wootters, Physical Review Letters 70, 1895 (1993). FIG. 2 shows a QB net for Teleportation. Reference Bra96: G. Brassard, Los Alamos eprint http://xxx.lanl.gov/abs/quant-ph/9605035, gives a SEO, expressed graphically as a qubit circuit, for Teleportation. It appears that the author of Bra96 obtained his circuit mostly by hand, based on information very similar to that contained in a QB net. The present invention gives a general method whereby such circuits can be obtained from a QB net in a completely mechanical way by means of a classical computer.

Step 1: Find Eras

Figure 3:
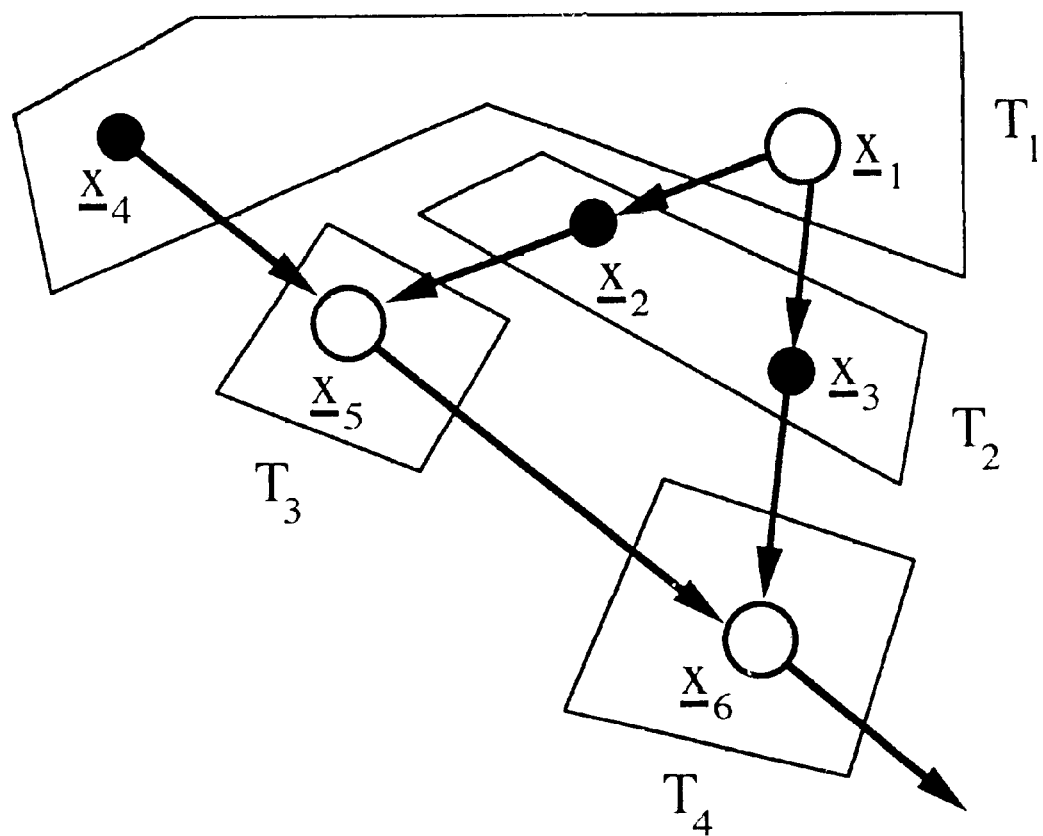
FIG. 3 shows the root node eras for the Teleportation net.

The root node eras of a graph are defined as follows. Call the original graph Graph(1). The first era $T_1$ is defined as the set of all root nodes of Graph(1). Call Graph(2) the graph obtained by erasing from Graph(1) all the $T_1$ nodes and any arrows connected to these nodes. Then $T_2$ is defined as the set of all root nodes of Graph(2). One can continue this process until one defines an era $T_{|\tau|}$ such that Graph($|\tau|$+1) is empty. (One can show that if Graph(1) is acyclic, then one always arrives at a Graph($|\tau|$+1) that is empty.) For example, FIG. 3 shows the root node eras of the Teleportation net FIG. 2. Let τ represent the set of eras: τ=$\{T_1,T_2,\ldots,T_{|\tau|}\}$. Note that $T_a \subset Z_{1,N}$ for all $a \in Z_{1,|\tau|}$ and the union of all $T_a$ equals $Z_{1,N}$. In mathematical parlance, the collection of eras is a partition of $Z_{1,N}$.

Figure 4:
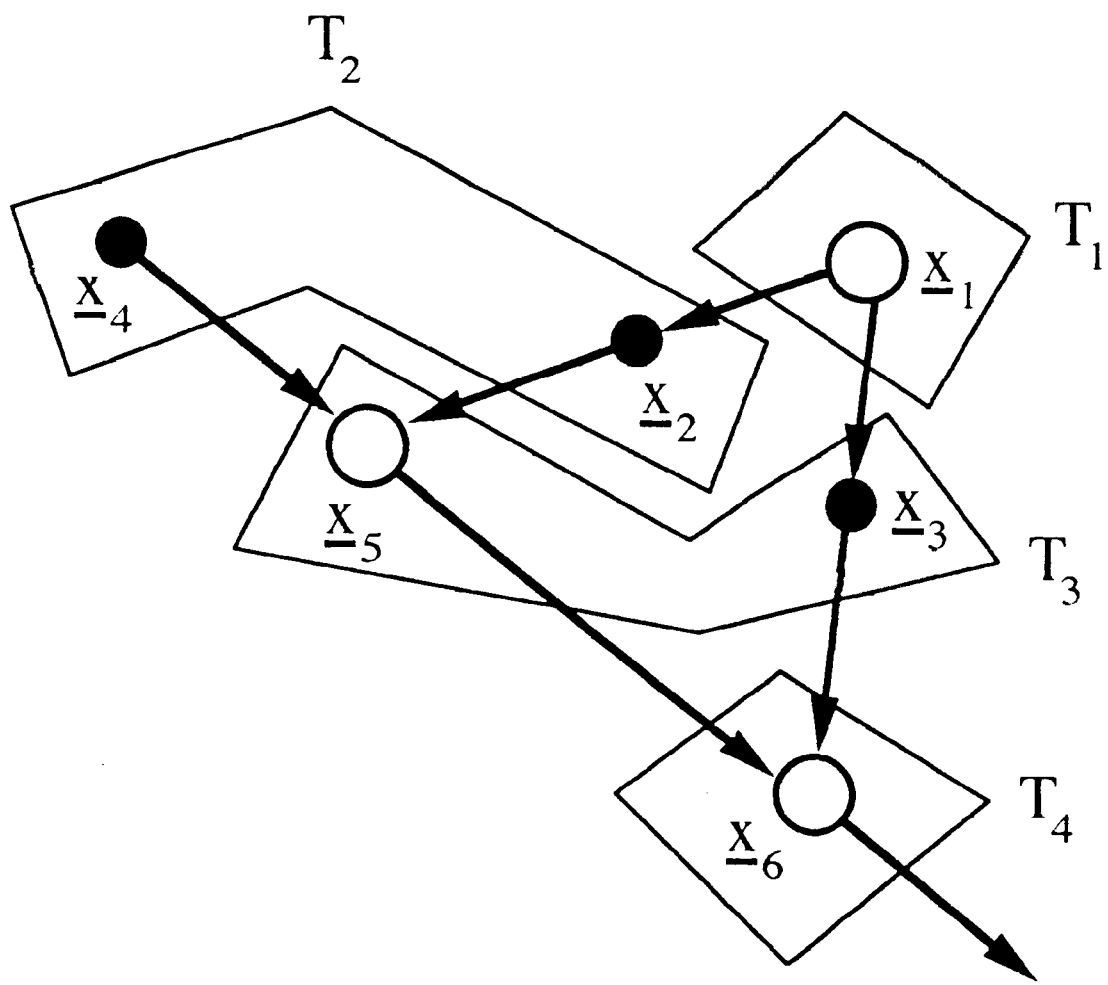
FIG. 4 shows the external node eras for the Teleportation net.

Rather than defining eras by (1) removing successive layers of root nodes, one can also define them by (2) removing successive layers of external nodes. We call this second type of era, the external node eras of the graph. For example, FIG. 4 shows the external node eras of the Teleportation net FIG. 9.

This process whereby one classifies the nodes of an acyclic graph into eras is a well know technique referred to as a chronological or topological sort in the computer literature. See, for example, Fla95: Bryan Flamig, *Practical Algorithms in C++* (Wiley, 1995) page 369.

Henceforth, for the sake of definiteness, we will speak only of root node eras. The case of external node eras can be treated similarly.

Suppose that $a \in Z_{1,|\tau|}$. The arrows exiting the a'th era are labelled by (x.)$_{T_a}$. Those entering it are labelled by (x.)$\Gamma_a$, where $\Gamma_a$ is defined by $\Gamma_a = \cup_{j \in T_a} S_j$. Note that the a'th era node is only entered by arrows from nodes that belong to previous (not subsequent) eras so $\Gamma_a \subset T_{a-1} \cup \ldots \cup T_2 \cup T_1$. The amplitude $B_a$ of the a'th era is defined as $$B_a[(x.)_{T_a} \mid (x.)_{\Gamma_a}] = \prod_{j \in T_a} A_j[x_j \mid (x.)s_j]. \tag{3}$$

The amplitude A(x.) of story x. is given by $$A(x.) = \prod_{a=1}^{|T|} B_a. \tag{4}$$

For example, for Teleportation we get from FIG. 3

$$B_1(x_1,x_4)=A_1(x_1)A_4(x_4), \tag{5a}$$

$$B_2(x_2,x_3|x_1)=A_2(x_2|x_1)A_3(x_3|x_1), \tag{5b}$$

$$B_3(x_5|x_2,x_4)=A_5(x_5|x_2,x_4), \tag{5c}$$

$$B_4(x_6|x_3,x_5)=A_6(x_6|x_3,x_5), \tag{5d}$$

and $$A(x.)=B_4B_3B_2B_1. \tag{6}$$

Step 2: Insert Delta Functions

The Feynman Integral FI for a QB net is defined by $$FI[(x.)z_{ext}] = \sum_{(x.)z_{int}} A(x.). \tag{7}$$

Note that we are summing over all stories x. that have (x.)$_{Z_{ext}}$ as their external state. We want to express the right side of Eq. (7) as a product of matrices.

Consider how to do this for Teleportation. In that case one has $$FI(x_6) = \sum_{x_1, x_2, \ldots x_5} B_4 B_3 B_2 B_1, \qquad (8)$$

where the $B_a$ are given by Eqs. (5). The right side of Eq. (8) is not ready to be expressed as a product of matrices because the column indices of $B_{a+1}$ and the row indices of $B_a$ are not the same for all $a \epsilon Z_{1,|\tau|-1}$. Furthermore, the variable $x_3$ occurs in $B_4$ and $B_2$ but not in $B_3$. Likewise, the variable $x_4$ occurs in $B_3$ and $B_1$ but not in $B_2$. Suppose we define $\overline{B}_a$ for $a \epsilon Z_{1,|\tau|}$ by $$\overline{B}_1(x_1^1, x_4^1) = B_1(x_1^1, x_4^1), \qquad (9a)$$

$$\overline{B}_2(x_2^2, x_3^2, x_4^2 | x_1^1, x_4^1) = B_2(x_2^2, x_3^2 | x_1^1) \delta(x_4^2, x_4^1), \qquad (9b)$$

$$\overline{B}_3(x_3^3, x_5^3 | x_2^2, x_3^2, x_4^2) = B_3(x_5^3, x_2^2, x_4^2) \delta(x_3^3, x_3^2), \qquad (9c)$$

$$\overline{B}_4(x_6 | x_3^3, x_5^3) = B_4(x_6 | x_3^3, x_5^3). \qquad (9d)$$

Then $$FI(x_6) = \sum_{interm} \overline{B}_4 \overline{B}_3 \overline{B}_2 \overline{B}_1, \qquad (10)$$

where we sum over all intermediate indices; i.e., all $x_j^a$ except $x_6$. Contrary to Eq. (8), the right side of Eq. (10) can be expressed immediately as a product of matrices since now $B_{a+1}$ column indices and $Ba$ row indices are the same. The purpose of inserting a delta function of $x_3$ into $B_3$ is to allow the system to "remember" the value of $X_3$ between non-consecutive eras $T_4$ and $T_2$. Inserting a delta function of $x_4$ into $B_2$ serves a similar purpose.

Figure 5:
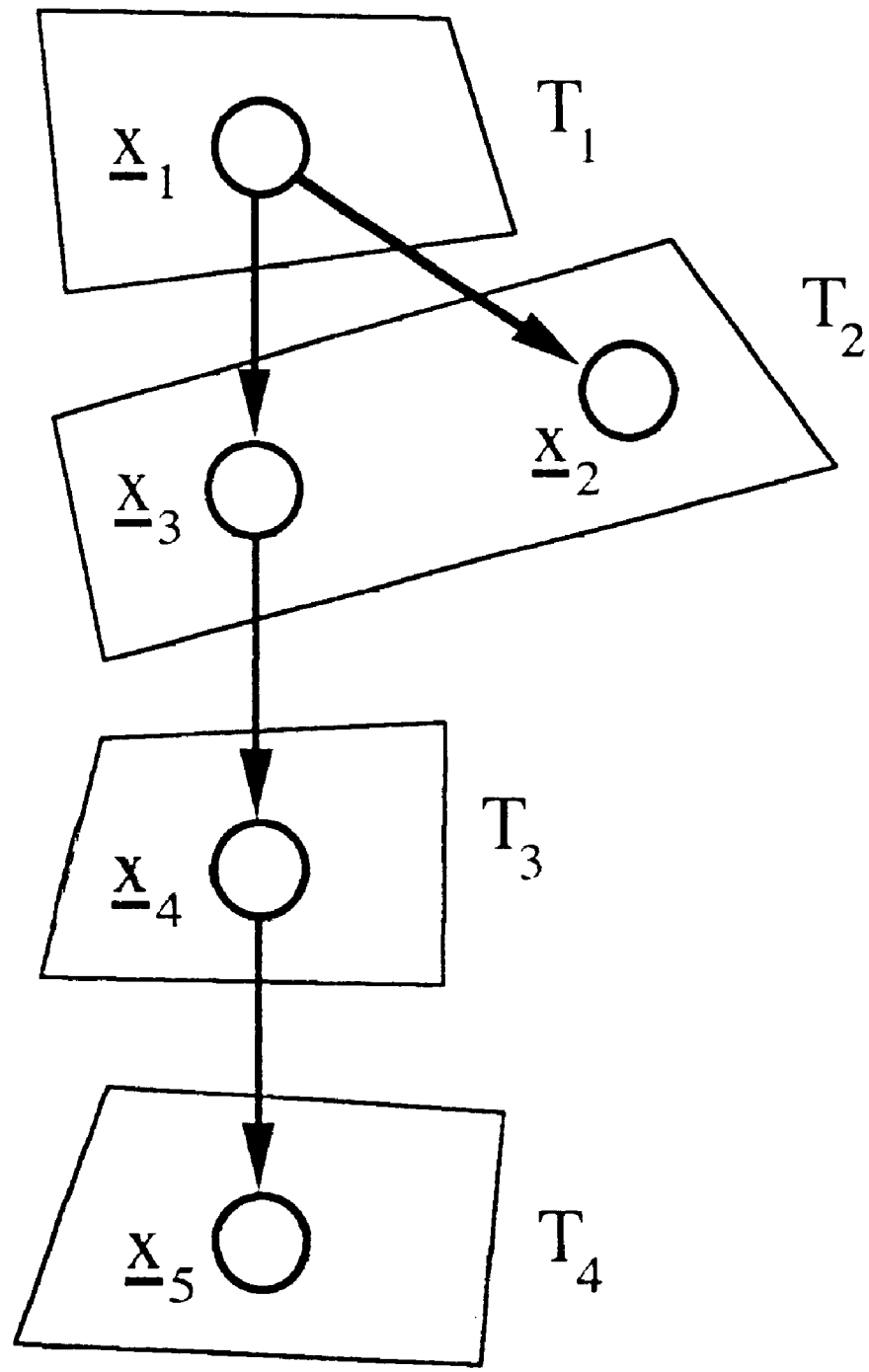
FIG. 5 shows an example of a QB net in which an external node is not in the final era.

In the Teleportation net of FIG. 2, the last era contains all the external nodes. However, for some QB nets like the one in FIG. 5. this is not the case. For the net of FIG. 5.

$$B_1(x_1) = A_1(x_1), \qquad (11a)$$

$$B_2(x_2, x_3 | x_1) = A_3(x_3 | x_1) A_2(x_2 | x_1), \qquad (11b)$$

$$B_3(x_4 | x_3) = A_4(x_4 | x_3), \qquad (11c)$$

$$B_4(x_5 | x_4) = A_5(x_5 | x_4). \qquad (11d)$$

Even though node $\hat{x}_2$ is external, the variable $x_2$ does not appear as a row index in $B_4$. Suppose we set $$\overline{B}_1(x_1^1) = B_1(x_1^1), \qquad (12a)$$

$$\overline{B}_2(x_2^2, x_3^2 | x_1^1) = B_2(x_2^2, x_3^2 | x_1^1), \qquad (12b)$$

$$\overline{B}_3(x_2^3, x_4^3 | x_2^2, x_3^2,) = B_3(x_4^3 | x_3^2) \delta(x_2^3, x_2^2), \qquad (12c)$$

$$\overline{B}_4(x_2, x_5 | x_2^3, x_4^3) = B_4(x_5 | x_4^3) \delta(x_2, x_2^3). \qquad (12d)$$

Then $$FI(x_2, x_5) = \sum_{interm} \overline{B}_4 \overline{B}_3 \overline{B}_2 \overline{B}_1, \qquad (13)$$

where we sum over all intermediate indices; i.e., all $x_j^a$ except $x_2$ and $x_5$. Contrary to $B_4$, the rows of $\overline{B}_4$ are labelled by the indices of both external nodes $\hat{x}_2$ and $\hat{x}_5$.

This technique of inserting delta functions can be generalized as follows to deal with arbitrary QB nets. For $j \epsilon Z_{1,N}$, let $a_{min}(j)$ be the smallest $a \epsilon Z_{1,|\tau|}$ such that $x_j$ appears in $B_a$. Hence, $a_{min}(j)$ is the first era in which $x_j$ appears. If $\hat{x}_j$ is an internal node, let $a_{max}(j)$ be the largest $a$ such that $x_j$ appears in $B_a$ (i.e., the last era in which $x_j$ appears). If $\hat{x}_j$ is an external node, let $a_{max}(j) = |\tau|+1$. For $a \epsilon Z_{1,|\tau|}$, let $$\Delta_a = \{j \epsilon Z_{1,N} | a_{min}(j) < a \leq a_{max}(J)\}, \qquad (14)$$

$$\overline{B}_a = B_a[(x.^a)_{T_a} | (x.^{a-1})_{\Gamma_a}] \prod_{j \in \Delta_a} \delta(x_j^a, x_j^{a-1}). \qquad (15)$$

In Eq. (15), $$x_j^{|\tau|}$$

should be identified with $x_j$ and $x_j^0$ with no variable at all. Equation (7) for FI can be written in terms of the $\overline{B}_a$ functions:

$$FI[(x.)_{Z_{ext}}] = \sum_{interm} \overline{B}_{|\tau|} \ldots \overline{B}_2 \overline{B}_1, \qquad (16)$$

where the sum is over all intermediate indices (i.e., all $x_j^a$ for which $a \neq |\tau|$). For all $a$, define matrix $M_a$ so that the x,y entry of $M_a$ is $\overline{B}_a(x|y)$. Define M to be a column vector whose components are the values of FI for each external state. Then Eq. (16) can be expressed as:

$$M = M_{|\tau|} \ldots M_2 M_1. \qquad (17)$$

The rows of the column vector $M_1$ are labelled by the possible values of $(x.)Z_{ext}$. The rows of the column vector $M_1$ are labelled by the possible values of $(x.)_{T_1}$, where $T_1$ is the set of root nodes.

Step 3: Find Unitary Extensions of Era Matrices

So far, we have succeeded in expressing FI as a product of matrices $M_a$, but these matrices are not necessarily unitary. In this step, we will show how to extend each $M_a$ matrix (by adding rows and columns) into a unitary matrix $U_a$.

By combining adjacent $M_a$'s, one can produce a new, smaller set of matrices $M_a$. Suppose the union of two consecutive eras is also defined to be an era. Then combining adjacent $M_a$'s is equivalent to combining consecutive eras to produce a new, smaller set of eras. We define a breakpoint as any position $a \epsilon Z_{1,|\tau|-1}$ between two adjacent matrices $M_{a+1}$ and $M_a$. Combining two adjacent $M_a$'s eliminates a breakpoint. Breakpoints are only necessary at positions where internal measurements are made. For example, in Teleportation experiments, one measures node $\hat{x}_5$. The subscript was mistyped which is in era $T_3$. Hence, a breakpoint between $M_4$ and $M_3$ is necessary. If that is the only internal measurement to be made, all other breakpoints can be dispensed with. Then we will have $M = M_2' M_1'$ where $M_2' = M_4$, $M_1' = M_3 M_2 M_1$. If no internal measurements are made, then we can combine all matrices $M_a$ into a single one, and eliminate all breakpoints.

We will henceforth assume that for all $a \epsilon Z_{1,|\tau|}$, the columns of $M_a$ are orthonormal. If for some $a_0 \epsilon Z_{1,|\tau|}$, $M_{a_0}$ does not satisfy this condition, it may be possible to "repair" $M_{a_0}$ so that it does. First: If a row $\beta$ of $M_{a_0-1}$ is zero, then eliminate the column $\beta$ of $m_{a_0}$, and the row $\beta$ of $M_{a-1}$. Next: If a row $\beta$ of the column vector $M_{a_0-1} \ldots M_2 M_1$ is zero, then flag the column $\beta$ of $M_{a_0}$. The flagged columns of $M_{a_0}$ can be changed without affecting the value of M. If the non-flagged columns of $M_{a_0}$ are orthonormal, and the number of columns in $M_{a_0}$ does not exceed the number of rows, then the Gram Schmidt method, to be discussed later, can be used to replace the flagged columns by new columns such that all the columns of the new matrix $M_{a_0}$ are orthonormal. If it is not possible to repair $M_{a_0}$ in any of the above ways (or in some other way that might become clear once we program this), one can always remove the breakpoint between $M_{a_0+1}$ and $M_{a_0}$.

We will call da the number of rows of matrix $M_a$ and $d_{a-1}$ its number of columns. We define D and $N_S$ by $$D = \max\{d_a | 1 \leq a \leq |\tau|\} \tag{18}$$

$$N_S = \min\{2^i | i \in Z_{1,\infty}, D \leq 2^i\}. \tag{19}$$

Let $\bar{d}_a = N_S - d_a$ for all a. For each $a \neq 1$, we define $U_a$ to be the matrix that one obtains by extending $M_a$ as follows. We append an $\bar{d}_a \times d_{a-1}$ block of zeros beneath $M_a$ and an $N_S \times \bar{d}_{a-1}$ block of gray entries to the right of $M_a$. By gray entries we mean entries whose value is yet to be specified. When a=1, $M_1$ be can extended in two ways. One can append a column of $\bar{d}_1$ zeros beneath it and call the resulting $N_S$ dimensional column vector $v_1$. Alternatively, one can append a column of $\bar{d}_1$ zeros beneath $M_1$ and an $N_S \times (N_S-1)$ block of gray entries to the right of $M_1$, and call the resulting $N_S \times N_S$ matrix $U_1$. In this second case, one must also insert $e_1$ to the right of $U_1$. By $e_1$ we mean the $N_S$ dimensional column vector whose first entry equals one and all others equal zero. Which extension of $M_1$ is used, whether the one that requires $e_1$ or the one that doesn't, should be left as a choice of the user. Henceforth, for the sake of definiteness, we will will assume that the user has chosen the extension without the $e_1$. The other case can be treated similarly. Equation (17) then becomes $$v = U_{|\tau|} \ldots U_3 U_2 v_1, \tag{20}$$

where v is just the column vector M with $\bar{d}_{|\tau|}$ zeros attached to the end.

To determine suitable values for the gray entries of the $U_a$ matrices, one call use the Gram-Schmidt (G.S.) method. (See Nob88: B. Noble and J. W. Daniels, *Applied Linear Algebra*, Third Edition (Prentice Hall, 1988)). This method takes as input an ordered set $S = (v_1, v_2, \ldots, v_N)$ of vectors, not necessarily independent ones. It yields as output another ordered set of vectors $S' = (u_1, u_2, \ldots, u_N)$, such that S' spans the same vector space as S. Some vectors in S' may be zero. Those vectors of S' which aren't zero will be orthonormal. For $r \in Z_{1,N}$, if the first r vectors of S are already orthonormal, then the first r vectors of S' will be the same as the first r vectors of S. Let $e_j$ for $j \in Z_{1,N_S}$ be the j'th standard unit vector (i.e., the vector whose j'th entry is one and all other entries are zero). For each $a \in Z_{1,|\tau|}$, to determine the gray entries of $U_a$ one can use the G.S. method on the set S consisting of the non-gray columns of $U_a$ together with the vectors $e_1, e_2, \ldots e_{N_S}$.

Step 4: Decompose Each Unitary Matrix Into a SEO

In this section we present a CS method for decomposing an arbitrary unitary matrix into a SEO. By following the previous 3 steps, one can reduce a QB net to a product of unitary operators $U_a$. By applying the CS method of this section to each of the matrices $U_a$, one can reduce the QB net to a SEO.

We will use the symbol $N_B$ for the number ($\geq 1$) of bits and $N_S = 2^{N_B}$ for the number of states with $N_B$ bits. We define Bool=$\{0,1\}$. We will use lower case Latin letters a,b,c ... $\in$Bool to represent bit values and lower case Greek letters $\alpha, \beta, \gamma, \ldots \in Z_{0,N_b-1}$ to represent bit positions. A vector such as $\vec{a} = a_{N_B-1} \ldots a_2 a_1 a_0$ will represent a string of bit values, $a_\mu$ being the value of the $\mu$'th bit for $\mu \in Z_{0,N_B-1}$. A bit string $\vec{a}$ has a decimal representation $$d(\vec{a}) = \sum_{\mu=0}^{N_B-1} 2^\mu a_\mu. \tag{21}$$

For $\beta \in Z_{0,N_B-1}$, we will use $\vec{u}(\beta)$ to denote the $\beta$'th standard unit vector, i.e, the vector with bit value of 1 at bit position $\beta$ and bit value of zero at all other bit positions.

$I_r$ will represent the r dimensional unit matrix. Suppose $\beta \in Z_{0,N_B-1}$ and M is any 2×2 matrix. Ve define M($\beta$) by $$M(\beta) = I_2(\times) \ldots (\times) I_2(\times) M(\times) I_2(\times) \ldots (\times) I_2, \tag{22}$$

where the matrix M on the right side is located at bit position $\beta$ in the tensor product of $N_B$ 2×2 matrices. The numbers that label bit positions in the tensor product increase from right to left ($\leftarrow$), and the rightmost bit is taken to be at position 0.

For any two square matrices A and B of the same dimension, we define the (·) product by $A(\cdot)B = ABA^\dagger$, where $A^\dagger$ is the Hermitian conjugate of A.

$\vec{\sigma} = (\sigma_x, \sigma_y, \sigma_z)$ will represent the vector of Pauli matrices, where $$\sigma_x = \begin{pmatrix} 0 & 1 \\ 1 & 0 \end{pmatrix}, \sigma_y = \begin{pmatrix} 0 & -i \\ i & 0 \end{pmatrix}, \sigma_z = \begin{pmatrix} 1 & 0 \\ 0 & -1 \end{pmatrix}. \tag{23}$$

The Sylvester-Hadamard matrices $H_r$ are $2^r \times 2^r$ matrices whose entry at row $\vec{a}$ and column $\vec{b}$ is given by $$(H_r)_{\vec{a},\vec{b}} = (-1)^{\vec{a} \cdot \vec{b}}, \tag{24}$$

where $$\vec{a} \cdot \vec{b} = \sum_{\mu=0}^{r-1} a_\mu b_\mu. \tag{25}$$

The qubit's basis states |0> and |1> will be represented by $$|0\rangle = \begin{bmatrix} 1 \\ 0 \end{bmatrix}, |1\rangle = \begin{bmatrix} 0 \\ 1 \end{bmatrix}. \tag{26}$$

The number operator n of the qubit is defined by $$n = \begin{bmatrix} 0 & 0 \\ 0 & 1 \end{bmatrix} = \frac{1 - \sigma_z}{2}. \tag{27}$$

Note that $$n|0\rangle = 0, n|1\rangle = |1\rangle. \tag{28}$$

We will often use $\bar{n}$ as shorthand for $$\bar{n} = 1 - n = \begin{bmatrix} 1 & 0 \\ 0 & 0 \end{bmatrix} = \frac{1 + \sigma_z}{2}. \tag{29}$$

We define $P_0$ and $P_1$ by $$P_0 = \bar{n} = \begin{bmatrix} 1 & 0 \\ 0 & 0 \end{bmatrix}, P_1 = n = \begin{bmatrix} 0 & 0 \\ 0 & 1 \end{bmatrix}. \tag{30}$$

For $\beta \in Z_{0,N_B-1}$, we define $P_0(\beta), P_1(\beta), n(\beta)$ and $\bar{n}(\beta)$ by means of Eq. (22). For $\vec{a} \in \text{Bool}^{N_B}$, let $$P_{\vec{a}} = P_{a_{N_B-1}}(\times) \ldots (\times) P_{a_2}(\times) P_{a_1}(\times) P_{a_0}. \tag{31}$$

As mentioned earlier, we utilize a mathematical technique called CS Decomposition. In this name, the letters C and S stand for "cosine" and "sine". Next we will state the special case of the CS Decomposition Theorem that arises in a preferred embodiment of the invention.

Suppose that U is an N×N unitary matrix, where N is an even number. Then the CS Decomposition Theorem states that one can always express U in the form $$U = \begin{bmatrix} L_0 & 0 \\ 0 & L_1 \end{bmatrix} D \begin{bmatrix} R_0 & 0 \\ 0 & R_1 \end{bmatrix}, \tag{32}$$

where $L_0, L_1, R_0, R_1$ are N/2×N/2 unitary matrices and $$D = \begin{bmatrix} D_{00} & D_{01} \\ D_{10} & D_{11} \end{bmatrix}, \tag{33a}$$

$$D_{00} = D_{11} = \text{diag}\left(C_1, C_2, \ldots, C_{\frac{N}{2}}\right), \tag{33b}$$

$$D_{01} = \text{diag}\left(S_1, S_2, \ldots, S_{\frac{N}{2}}\right), \tag{33c}$$

$$D_{10} = -D_{01}. \tag{33d}$$

For $i \in \{1, 2, \ldots, N/2\}$, $C_i$ and $S_i$ are real numbers that satisfy $$C_i^2 + S_i^2 = 1. \tag{33e}$$

Henceforth, we will use the term D matrix to refer to any matrix that satisfies Eqs. (33). If one partitions U into four blocks $U_{ij}$ of size $$\frac{N}{2} \times \frac{N}{2},$$

then $$U_{ij} = L_i D_{ij} R_j, \tag{34}$$

for $i, j \in \{0, 1\}$. Thus, $D_{ij}$ gives the singular values of $U_{ij}$.

More general versions of the CS Decomposition Theorem allow for the possibility that we partition U into 4 blocks of unequal size.

Note that if U were a general (not necessarily unitary) matrix, then the four blocks $U_{ij}$ would be unrelated. Then to find the singular values of the four blocks $U_{ij}$ would require eight unitary matrices (two for each block), instead of the four $L_i, R_j$. This double use of the $L_i, R_j$ is a key property of the CS decomposition.

Figure 6:
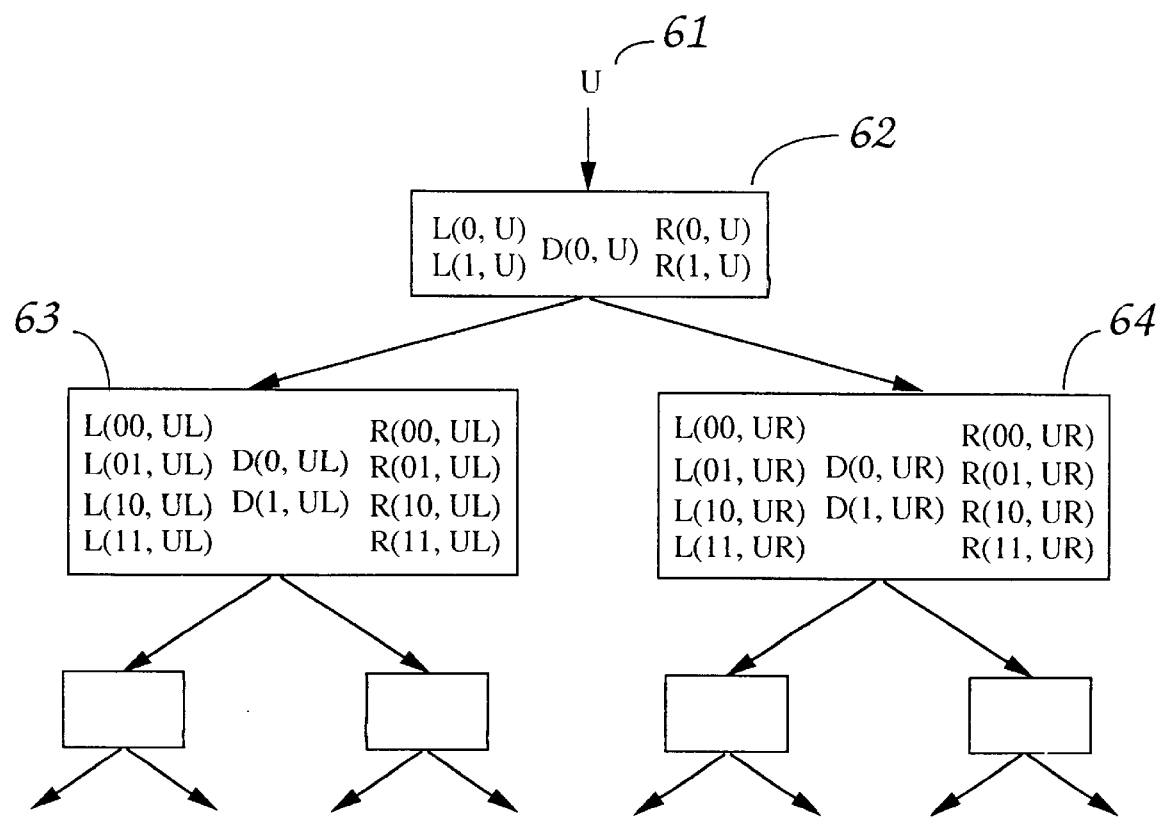
FIG. 6 shows a binary tree. Each node β has a single parent. If the parent is to β's right (ditto, left), then β contains the names of the matrices produced by applying the CS Decomposition Theorem to the L matrices (ditto. R matrices) of β's parent.

Consider FIG. 6. We start at 61 with a unitary matrix U. Without loss of generality, we can assume that the dimension of U is $2^{N_B}$ for some $N_B \geq 1$. (If initially U's dimension is not a power of 2, we replace it by a direct sum $U(+)I_r$ whose dimension is a power of two.) We apply the CS Decomposition method to U. This yields node 62 comprising matrix D(0,U) of singular values, two unitary matrices L(0,U) and L(1,U) on the left and two unitary matrices R(0,U) and R(1,U) on the right. Then we apply the CS Decomposition method to each of the 4 matrices L(0,U),L(1,U),R(0,U) and R(1,U) and obtain nodes 63 and 64. Then we apply the CS Decomposition method to each of the 16 R and L matrices in nodes 63 and 64. And so on. This process ends when the current row of nodes in the pyramid of FIG. 6 has L's and R's that are 1×1 dimensional, i.e., just complex numbers.

Call a central matrix either (1) a single D matrix, or (2) a direct sum $D_1(+)D_2(+) \ldots (+)D_r$ of D matrices, or (3) a diagonal unitary matrix. From FIG. 6 it is clear that the initial matrix U can be expressed as a product of central matrices, with each node of the tree providing one of the central matrices in the product. Next, we show how to decompose each of the 3 possible kinds of central matrices into a SEO.

Case 1: Central Matrix is a Single D Matrix

Consider how to decompose a central matrix when it is a single D matrix. Before dealing with arbitrary $N_B$ consider $N_B = 3$. Then the central matrix D can be expressed as:

$$D = \sum_{a,b \in \text{Bool}} \exp(i\phi_{ab}\sigma_y)(x)P_a(x)P_b. \tag{35}$$

Suppose $\vec{\phi}$ (ditto, $\vec{\theta}$) is a column vector whose components are the numbers $\phi_{\vec{a}}$ (ditto, $\theta_{\vec{a}}$) arranged in order of increasing $\vec{a}$. We define new angles $\vec{\theta}$ in terms of the angles $\vec{\phi}$ by $$\vec{\theta} = \frac{1}{A} H_2 \vec{\phi}. \tag{36}$$

Then one can show that $$D = A_{00} A_{01} A_{10} A_{11}, \tag{37}$$

where $$A_{00} = \exp(i\theta_{00}\sigma_y)((x)I_2(x)I_2), \tag{38a}$$

$$A_{01} = \sigma_x(2)^{n(0)}(\cdot)[\exp(i\theta_{01}\sigma_y)(x)I_2(x)I_2], \tag{38b}$$

$$A_{10} = \sigma_x(2)^{n(1)}(\cdot)[\exp(i\theta_{10}\sigma_y)(x)I_2(x)I_2], \tag{38c}$$

$$A_{11} = [\sigma_x(2)^{n(1)}\sigma_x(2)^{n(0)}](\cdot)[\exp(i\theta_{11}\sigma_y)(x)I_2(x)I_2]. \tag{38d}$$

Eqs. (37)–(38) achieve our goal of decomposing D into a SEO. Now consider an arbitrary $N_B$. D can be written as $$D = \sum_{\vec{a} \in \text{Bool}^{N_B-1}} \exp(i\phi_{\vec{a}}\sigma_y)(x)P_{\vec{a}}, \tag{39}$$

where the $\phi_{\vec{a}}$ are real numbers. We define new angles $\vec{\theta}$ in terms of the angles $\vec{\phi}$ by $$\vec{\theta} = \frac{1}{2^{N_B-1}} H_{N_B-1} \vec{\phi}. \tag{40}$$

Then one can show that $$D = \prod_{\vec{b} \in Bool^{N_B-1}} A_{\vec{b}}, \qquad (41)$$

where the operators $A_{\vec{b}}$ on the right side commute and will be defined next. For any $\vec{b} \in Bool^{N_B-1}$ we can write $$\vec{b} = \sum_{j=0}^{r-1} \vec{u}(\beta_j), \qquad (42)$$

where $$N_B - 2 \geq \beta_{r-1} > \ldots \beta_1 > \beta_0 \geq 0. \qquad (43)$$

In other words, $\vec{b}$ has bit value of 1 at bit positions $\beta_j$. At all other bit positions, $\vec{b}$ has bit value of 0. r is the number of bits in $\vec{b}$ whose value is 1. When $\vec{b} = 0$, $r = 0$. One can show that $$A_{\vec{b}} = [\sigma_x(N_B-1)^{n(\beta_{r-1})} \ldots \sigma_x(N_B-1)^{n(\beta_1)} \sigma_x(N_B-1)^{n(\beta_0)}](\cdot) \exp[i\,\theta_{\vec{b}}\sigma_y(N_B-1)]. \qquad (44)$$

There are other ways of decomposing $A\vec{b}$ into a SEO.

Case 2: Central Matrix is Direct Sum of D Matrices

Next, consider how to decompose a central matrix when it is a direct sum of D matrices. Consider first the case $N_B = 3$. Let $R(\phi) = \exp(i\sigma_y\phi)$. Previously we mentioned the fact that any D matrix D can be expressed as $$D = \sum_{a,b \in Bool} R(\phi''_{ab})(\times) P_a(\times) P_b. \qquad (46)$$

One can also show that $$D_0(+)D_1 = \sum_{a,b \in Bool} P_a(\times) R(\phi'_{ab})(\times) P_b, \qquad (47)$$

$$D_{00}(+)D_{01}(+)D_{10}(+)D_{11} = \sum_{a,b \in Bool} P_a(\times) P_b(\times) R(\phi_{ab}), \qquad (48)$$

where the $D_j$ and $D_{ij}$ are D matrices. It follows that by permuting the bit positions, we can change such a direct sum of D matrices into a single D matrix. The latter can then be decomposed into a SEO by the method already discussed.

Case 3: Central Matrix is a Diagonal Unitary Matrix

Finally, consider how to decompose a central matrix when it is a diagonal unitary matrix. Before dealing with arbitrary $N_B$, consider $N_B = 2$. Then the central matrix C can be expressed as $$C = \text{diag}(e^{i\phi_{00}}, e^{i\phi_{01}}, e^{i\phi_{10}}, e^{i\phi_{11}}). \qquad (49)$$

We define $\vec{\theta}$ by $$\vec{\theta} = \frac{1}{4} H_2 \vec{\phi}. \qquad (50)$$

One can show that $$C = A_{00} A_{01} A_{10} A_{11}, \qquad (51)$$

where $$A_{00} = \exp(i\theta_{00}), \qquad (52a)$$

$$A_{01} = I_2(\times)\exp(i\theta_{01}\sigma_z), \qquad (52b)$$

$$A_{10} = \exp(i\theta_{10}\sigma_z)(\times)I_2, \qquad (52c)$$

$$A_{11} = \sigma_x(0)^{n(1)}(\cdot)[I_2(\times)\exp(i\theta_{11}\sigma_z)]. \qquad (52d)$$

Now consider an arbitrary $N_B$. Any diagonal unitary matrix C can be expressed as $$C = \sum_{\vec{a} \in Bool^{N_B}} \exp(i\phi_{\vec{a}}) P_{\vec{a}}, \qquad (53)$$

where the $\phi_{\vec{a}}$ are real numbers. We define $\vec{\theta}$ by $$\vec{\theta} = \frac{1}{2^{N_B}} H_{N_B} \vec{\phi}. \qquad (54)$$

Then one can show that $$C = \prod_{\vec{b} \in Bool^{N_B}} A_{\vec{b}}, \qquad (55)$$

where the $A_{\vec{b}}$ operators commute and will be defined next. For any $\vec{b} \in Bool^{N_B}$, we can write $$\vec{b} = \sum_{j=0}^{r-1} \vec{u}(\beta_j), \qquad (56)$$

where $$N_B - 1 \geq \beta_{r-1} > \ldots > \beta_1 > \beta_0 \geq 0. \qquad (57)$$

One can show that $$A_{\vec{b}} = \begin{cases} \exp[i\theta_0] & \text{if } r = 0 \\ \exp[i\theta_{\vec{b}}\sigma_z(\beta_0)] & \text{if } r = 1 \\ [\sigma_x(\beta_0)^{n(\beta_{r-1})} \cdots \sigma_x(\beta_0)^{n(\beta_2)} \sigma_x(\beta_0)^{n(\beta_1)}](\cdot)\exp[i\theta_{\vec{b}}\sigma_z(\beta_0)] & \text{if } r \geq 2. \end{cases} \qquad (58)$$

There are other ways of decomposing $A\vec{b}$ into a SEO.

(B) Implementation of New Method on Classical Computer

So far in Section (A), we have described a mathematical algorithm for decomposing any QB net into a SEO. Next we describe a particular implementation of the algorithm, a computer program called "Qubiter" that can be run on a classical computer.

The use of a computer is practically indispensable for obtaining useful numerical answers through the method of Section (A). In all but, the simplest of cases, vast amounts of data storage and processing are necessary to obtain final numerical answers from the method of Section (A). The necessary book-keeping and number crunching are prohibitively error prone and time consuming to a human, but not to a computer.

Figure 7:
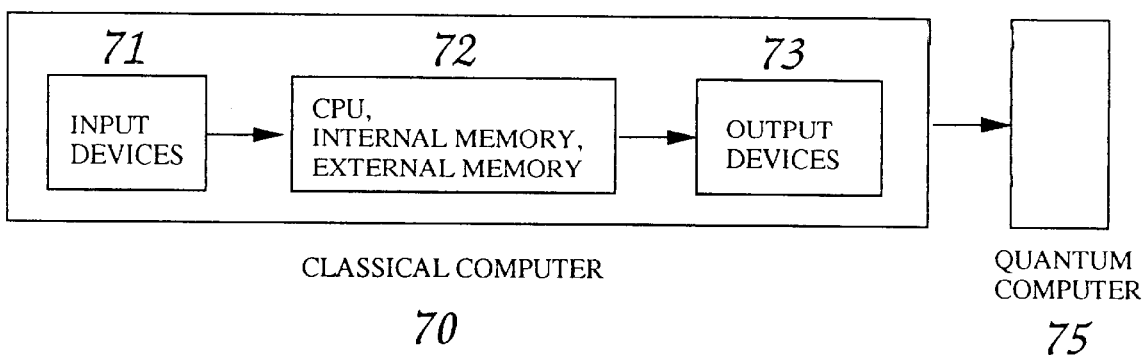
FIG. 7 shows a block diagram of a classical computer feeding data to a quantum computer.

A preferred embodiment of the invention is a classical computer that feeds data (a SEO) to a quantum computer. The classical computer is a Mac computer, produced by Apple Computer Inc. of Cupertino, Calif. The Mac is running a program written in the computer language C++. Of course, this invention could just as easily be implemented in a language other than C++, and on a platform other than a Mac. FIG. 7 is a block diagram of a classical computer feeding data to a quantum computer. 70 represents a classical computer. It comprises 71, 72, 73. 71 represents input devices, such as a mouse or a keyboard. 72 represents the CPU, internal and external memory units. 72 does calculations and stores information. 73 represents output devices, such as a printer or a display screen. An image of a QB net (for example, FIG. 2) can be rendered on the display screen. 75 represents a quantum computer, comprising an array of quantum bits and some hardware for manipulating the state of those bits.

A preferred embodiment of the invention was written using CodeWarrior™ CodeWarrior is a C++ Integrated Development Environment produced by MetroWerks Inc. of Austin, Tex.

Appendix A is a listing of the names of all the files in the "CodeWarrior Project" for Qubiter. Appendix B is a listing of Qubiter source code. Apart from libraries provided with CodeWarrior, Qubiter requires parts of the C library called Clapack. This library is freeware and can be downloaded via the Internet from the website "www.netlib.org".

Qubiter uses files that list the entries of a unitary matrix U. FIG. 8 shows an example of such files. Qubiter ignores the lines labelled 81 and 83. The line labelled 82 tells how many bits are necessary to label U's columns (or rows, since U must be square). In the example of FIG. 8, according to 82, two bits are necessary to label U's column, so one expects U to be a 4×4 matrix with 16 elements. 84 labels all the lines after the line labelled 83. Each line in 84 represents a complex number z, the real part of z is listed first, then some white space to the right of it, and then the imaginary part of z to the right of that. 84 contains the entries of U, arranged so that the entries in the first column of U are listed first, then those of the second column of U, etc.

Qubiter also uses files that list SEOs. FIG. 9 is an example of such a file. The line labelled 91 tells how many bits the gates listed in the file are to operate on, (i.e., what we called $N_B$ in Section (A)). 92 labels all the other lines in the file. Each line in 92 represents a gate. There are four types of gates, and they are specified as follows:

(a) PHAS ang where ang is a real number. This signifies a phase factor $$\exp\left(i(ang)\frac{\pi}{180}\right).$$

(b) CNOT α char β where $\alpha, \beta \in Z_{0,N_B-1}$ and char $\epsilon \{T, F\}$. T and F stand for true and false. If char is the character T, this signifies $\sigma_x(\beta)^{n(\alpha)}$. Read if "c-not: if α is true, then flip β." If char is the character F, this signifies $\sigma_x(\beta)^{\bar{n}(\alpha)}$. Read it as "c-not: if α is false, then flip β."

(c) ROTY α ang where $\alpha \in Z_{0,N_B-1}$ and ang is a real number. This signifies the rotation of qubit α about the Y axis by an angle ang in degrees. In other words, $$\exp\left(i\sigma_y(\alpha)ang\frac{\pi}{180}\right).$$

(d) ROTZ α ang

This is the same as (c) except that the rotation is about the Z axis instead of the Y one.

The matrix given in FIG. 8 can be decomposed into the SEO given in FIG. 9. Such decompositions are not unique. After doing the trivial optimization of removing all factors $A_{\vec{v}}$ for which the rotation angle is zero, the 33 operations in FIG. 9 reduce to 25 operations in FIG. 10.

Qubiter starts by looking for a parameter file entitled "qbtr-params.in". FIG. 11 is an example of such a file. Lines labelled 111, 113, 115 and 117 are ignored by the program. Lines labelled 112, 114, 116, 118 are not.

The user should enter into line 112 the name of a matrix. In FIG. 11, we have used "DiscFourier2bits".

If the user enters "yes" into line 114 as an answer to "Do compilation?", then Qubiter will look for a file named "DiscFourier2bits.in". In other words, it will look for a file whose name is the string in line 112 plus the suffix ".in". Qubiter expects to find in this file the entries of the unitary matrix $U_{initial}$ to be decomposed. The file should be of the form exemplified by FIG. 8.

If the user enters "yes" into line 116 as an answer to "Do decompilation?", then Qubiter will look for a file named "DiscFourier2bits-cmnd.out". In other words, it will look for a file whose name is the string in line 112 plus the suffix "-cmnd.out". Qubiter expects to find in this file a SEO. The file should be of the form exemplified by FIGS. 9 and 10.

If the user enters "yes" into line 118 as an answer to "Do zero angle optimization?", then Qubiter will produce a file of the type exemplified by FIG. 10 instead of the type exemplified by FIG. 9. Thus, it will omit those gates arising from a rotation by a zero angle.

Qubiter has 2 main modes of operation.

The first mode of operation is when the user enters "yes" in line 114 as an answer to "Do compilation?", and "yes" in line 116 as an answer to "Do decompilation?" In this mode, the user must provide 2 input files entitled "qbtr-params.in" and "mat.in", where "mat" is the string in line 112. Qubiter will output a file called "mat-cmnd.out". Then it will use mat-cmnd.out as input, multiply the SEO listed in this file, arrive at a unitary matrix $U_{final}$, and output a file called "mat-check.out" which lists the entries of $U_{final}$. If everything goes well, the matrix $U_{initial}$ specified by file "mat.in" and the matrix $U_{final}$ specified by file "mat-check.out" will be the same matrix, within machine precision.

The second mode of operation is when the user enters "no" in line 114 as an answer to "Do compilation?", and "yes" in line 116 as an answer to "Do decompilation?"In this mode, the user must provide 2 input files entitled "qbtr-params.in" and "mat-cmnd.out". Qubiter will multiply the SEO listed in "mat-cmnd.out", arrive at a unitary matrix $U_{final}$, and output a file called "mat-check.out" which lists the entries of $U_{final}$.

We should also mention a small frill to the first mode of operation. At the same time that Qubiter outputs the file "mat-cmnd.out", it also outputs a file called "mat-pict.out" which is a translation of "mat-cmnd.out" to a pictorial language. Each elementary gate is represented by a line in "mat-pict.out". Consider a single line of the file. There is a 1 to 1 correspondence between the characters in the line and the qubits of an array of qubits. The rightmost character represents bit 0. The next to rightmost character in the line represents bit 1. And so on. A bit that is not operated on is represented by a "|" character. A bit that is rotated about the Z axis (ditto, Y axis) is represented by a "Z" character (ditto, "Y" character). If the gate is a c-not that flips a bit when the control bit is true (ditto, false), then the control bit is represented by a "@" character (ditto, "0" character). The bit to be flipped is represented by an "X" character. If the gate is a pure phase acting on all bits, all bits are represented by the ~ character.

The CS Decomposition is intimately related to the Generalized Singular Value Decomposition (GSVD). In fact, Qubiter1.0 does CS decompositions by means of a Clapack subroutine for doing GSVD. For more information about the GSVD and its connection to the CS Decomposition, see Pai94 and references therein. See also the Clapack documentation that comes with the subroutine zggsvd.c So far, we have described version 1.0 of Qubiter. Future versions of Qubiter are planned that will: (1)Take as input an arbitrary QB net (not just 2 connected nodes), and return as output a SEO. (2) Add quantum error correction code to the input QB net. (3)Include speed optimizations enabling it to produce SEOs with fewer steps.

In classical computation, the basic set of elementary operators is not unique. For example, instead of using AND, NOT and OR gates, one can just use NAND gates. The same is true in quantum computation: the basic set of elementary Operators is not unique. In this preferred embodiment of the invention, we use the set {CONTROLLED-NOT, QUBIT ROTATION} of elementary operators, but the invention also applies to other sets of elementary operators.

So far, we have described what are at present the preferred embodiments of this invention. Those skilled in the art will be able to come up with many modifications to the given embodiments without departing from the present invention. It is therefore desired that the scope of the invention be determined by the appended claims rather than by the given embodiments.

I claim:

1. A product of manufacture comprised of a computer readable medium and thereon stored a method of operating a classical computer to calculate a sequence of operations with the purpose of applying said sequence of operations to a quantum computer to induce said quantum computer to execute a desired calculation, said method comprising the steps of:

storing in said classical computer a QB net data-set comprising:
(a) graph information comprising a label for each node of a plurality of N nodes, and also comprising a plurality of directed lines, wherein a directed line comprises an ordered pair of said node labels, wherein one member of said label pair labels the source node and the other member labels the destination node of the directed line,
(b) state information comprising, for each j $\in\{1,2,\ldots N\}$, a finite set $\Sigma j$ containing labels for the states that the j'th node $\hat{x}_j$ may assume, and
(c) amplitude information comprising, for each j $\in\{1, 2, \ldots N\}$, a representation of a complex number $$A_j\left[x_j \mid x_{k_1}, x_{k_2}, \ldots, x_{k_{|S_j|}}\right]$$

for each vector $$\left(x_j, x_{k_1}, x_{k_2}, \ldots, x_{k_{|S_j|}}\right)$$

such that $x_j \in \Sigma_j, x_{k_1} \in \Sigma_{k_1}, x_{k_2} \in \Sigma_{k_2}, \ldots$, and $$x_{k_{|S_j|}} \in \sum_{k_{|S_j|}},$$

wherein $$\left(\hat{x}_{k_1}, \hat{x}_{k_2}, \ldots, \hat{x}_{k_{|S_j|}}\right)$$

are the $|S_j|$ nodes connected to $\hat{x}_j$ by directed lines entering $\hat{x}_j$, wherein said directed lines entering $\hat{x}_j$ transmit the state of their source node, wherein said $|S_j|$ is an integer greater or equal to zero, composing with said classical computer and using said QB net data-set, a data-set that specifies a unitary matrix $V_{in}$, calculating said sequence of operations using said classical computer, wherein said sequence of operations and said $V_{in}$ both would, if applied to an array of qubits, produce equivalent transformations of the array.

2. The method of claim 1, wherein said sequence of operations comprises c-not operations.

3. The method of claim 1, wherein said sequence of operations comprises qubit rotation operations.

4. The method of claim 1, further utilizing a quantum computer, comprising the additional step of:

manipulating said quantum computer largely according to said sequence of operations.

5. The method of claim 1, wherein said classical computer includes a unitary matrix decomposer which is used in the calculation of said sequences of operations, wherein if the decomposer is given data that fairly directly specifies a unitary matrix U, then the decomposer will calculate a data-set that fairly directly specifies three unitary matrices: L, D, R, such that the following matrix equation holds: U=LDR.

6. The method of claim 1, wherein said classical computer includes a unitary matrix decomposer which is used in the calculation of said sequences of operations, wherein if the decomposer is given data that fairly directly specifies a unitary matrix U, then the decomposer will calculate a data-set that fairly directly specifies eight unitary matrices: $D_{00}, D_{01}, D_{10}, D_{11}$, and $L_0, L_1, R_0, R_1$, such that if one partitions said U into four blocks $U_{00}, U_{01}, U_{10}, U_{11}$, then the following four matrix equations hold: $U_{ij}=L_iD_{ij}R_j$ for i $\in$Bool and j $\in$Bool.

7. The method of claim 1, comprising the additional step of:

calculating with said classical computer and using said QB net data-set, a tree data-set that comprises data that can be represented as a node matrix for each node contained in a subset of the nodes of a tree, wherein the product, in some order defined by the tree, of all said node matrices is equivalent to said $V_{in}$.

8. A product of manufacture comprised of a computer readable medium and thereon stored a method of operating a classical computer having display, storage and calculation means, to analyze a quantum system that exhibits quantum mechanical behavior, said method comprising the steps of:

displaying on said display means a graph comprising a plurality of N nodes, and a plurality of directed lines connecting certain pairs of said nodes, storing in said storage means a QB net data-set comprising:
  (a) graph information comprising a label for each of said N nodes, and also comprising, for each said directed line, said node label for the source node and for the destination node of the directed line,
  (b) state information comprising, for each $j \in \{1, 2, \ldots N\}$, a finite set $\Sigma_j$ containing labels for the states that the j'th node $\hat{x}_j$ may assume, and
  (c) amplitude information comprising, for each $j \in \{1, 2, \ldots N\}$, a representation of a complex number $$A_j\left[x_j \mid x_{k_1}, x_{k_2}, \ldots, x_{k_{|S_j|}}\right]$$

for each vector $$\left(x_j, x_{k_1}, x_{k_2}, \ldots, x_{k_{|S_j|}}\right)$$

such that $x_j \in \Sigma_j$, $x_{k_1} \in \Sigma_{k_1}$, $x_{k_2} \in \Sigma_{k_2}$, ..., and $$x_{k_{|S_j|}} \in \sum_{k_{|S_j|}},$$

wherein $$\left(\hat{x}_{k_1}, \hat{x}_{k_2}, \ldots, \hat{x}_{k_{|S_j|}}\right)$$

are the $|S_j|$ nodes connected to $\hat{x}_j$ by directed lines entering $\hat{x}_j$, wherein said directed lines entering $\hat{x}_j$ transmit the state of their source node, wherein said $|S_j|$ is an integer greater or equal to zero, composing with said calculation means and using said QB net data-set a data-set that specifies a unitary matrix $V_{in}$, calculating with said calculation means and using said QB net data-set, a sequence of operations on qubits, wherein said sequence of operations and said $V_{in}$ both would, if applied to an array of qubits, produce equivalent transformations of the array.

9. The product of manufacture of claim 8, wherein said sequence of operations comprises c-not operations.

10. The product of manufacture of claim 8, wherein said sequence of operations comprises qubit rotation operations.

11. The product of manufacture of claim 8, further utilizing a quantum computer, comprising the additional step of:
  manipulating said quantum computer largely according to said sequence of operations.

12. The product of manufacture of claim 8, wherein said classical computer includes a unitary matrix decomposer which is used in the calculation of said sequences of operations, wherein if the decomposer is given data that fairly directly specifies a unitary matrix U, then the decomposer will calculate a data-set that fairly directly specifies three unitary matrices: L, D, R, such that the following matrix equation holds: U=LDR.

13. The product of manufacture of claim 8, wherein said classical computer includes a unitary matrix decomposer which is used in the calculation of said sequences of operations, wherein if the decomposer is given data that fairly directly specifies a unitary matrix U, then the decomposer will calculate a data-set that fairly directly specifies eight unitary matrices: $D_{00}$, $D_{01}$, $D_{10}$, $D_{11}$, and $L_0$, $L_1$, $R_0$, $R_1$, such that if one partitions said U into four blocks $U_{00}$, $U_{01}$, $U_{10}$, $U_{11}$, then the following four matrix equations hold: $U_{ij}$32 $L_i D_{ij} R_j$ for $i \in$ Bool and $j \in$ Bool.

14. The product of manufacture of claim 8, comprising the additional step of:
  calculating with said classical computer and using said QB net data-set a tree data-set that comprises data that can be represented as a node matrix for each node contained in a subset of the nodes of a tree, wherein the product, in some order defined by the tree, of all said node matrices is equivalent to said $V_{in}$.

15. A product of manufacture comprised of a computer readable medium and thereon stored a method of operating a classical computer to calculate a sequence of operations with the purpose of applying said sequence of operations to a quantum computer to induce said quantum computer to execute a desired calculation, wherein said classical computer comprises a unitary matrix decomposer, wherein if said unitary matrix decomposer is given data that fairly directly specifies a unitary matrix U, then the decomposer will calculate a data-set that fairly directly specifies three unitary matrices: L, D, R, such that the following matrix equation holds: U=LDR, said method comprising the steps of:

storing in said classical computer an input data-set that fairly directly specifies a unitary matrix $V_{in}$, wherein at least one row of $V_{in}$ has 3 or more non-zero entries and at least one column of $V_{in}$ has 3 or more non-zero entries, calculating with said classical computer using said input data-set and said unitary matrix decomposer, a sequence of operations on qubits, wherein said sequence of operations and said $V_{in}$ both would, if applied to an array of qubits, produce equivalent transformations of the array.

16. The product of manufacture of claim 15, wherein if said unitary matrix decomposer is given data that fairly directly specifies a unitary matrix U, then the decomposer will calculate a data-set that fairly directly specifics eight unitary matrices: $D_{00}$, $D_{01}$, $D_{10}$, $D_{11}$, and $L_0$, $L_1$, $R_0$, $R_1$, such that if one partitions said U into four blocks $U_{00}$, $U_{01}$, $U_{10}$, $U_{11}$, then the following four matrix equations hold: $U_{ij} = L_i D_{ij} R_j$ for $i \in$ Bool and $j \in$ Bool.

17. The product of manufacture of claim 15, wherein said sequence of operations comprises c-not operations.

18. The product of manufacture of claim 15, wherein said sequence of operations comprises qubit rotation operations.

19. The product of manufacture of claim 15, wherein some of said sequences of operations comprise qubit rotations and c-nots.

20. The product of manufacture of claim 15, further utilizing a quantum computer, comprising the additional step of:
  manipulating said quantum computer largely according to said sequence of operations.

21. A product of manufacture comprised of a computer readable medium and thereon stored a method of operating a classical computer to calculate a sequence of operations with the purpose of applying said sequence of operations to a quantum computer to induce said quantum computer to execute a desired calculation, said method comprising the steps of:

storing in said classical computer an input data-set that fairly directly specifies a unitary matrix $V_{in}$, wherein at least one row of $V_{in}$ has 3 or more non-zero entries and at least one column of $V_{in}$ has 3 or more non-zero entries, calculating with said classical computer and using said input data-set, a tree data-set that comprises data that can he represented as a node matrix for each node contained in a subset of the nodes of a tree, wherein the product, in some order defined by the tree, of all said node matrices is equivalent to said $V_{in}$, calculating with said classical computer and using said tree data-set, for each of the node matrices M, a sequence of operations on qubits, wherein said sequence of operations and said M both would, if applied to an array of qubits, produce equivalent transformations of the array.

22. The product of manufacture of claim 21, wherein some of said sequences of operations comprise c-not operations.

23. The product of manufacture of claim 21, wherein some of said sequences of operations comprise qubit rotation operations.

24. The product of manufacture of claim 21, wherein some of said sequences of operations comprise qubit rotations and c-nots.

25. The product of manufacture of claim 21, wherein said sequences of operations are sequences of elementary operations.

26. The product of manufacture of claim 21, further utilizing a quantum computer, comprising the additional step of:

manipulating said quantum computer largely according to said sequence of operations.

27. The product of manufacture of claim 21, wherein if said $V_{in}$ is a square matrix with N rows, then said node matrices are also square matrices with N rows and with at most two non-zero entries in each row and in each column.

28. The product of manufacture of claim 21, wherein if said $V_{in}$ is a square matrix with N rows, then said node matrices are also square matrices with N rows and with about two non-zero entries in each row and in each column.

29. The product of manufacture of claim 21, wherein if said $V_{in}$ is a square matrix with N rows, then said node matrices have theoretically a number of nonzero real parameters which grows linearly with N or slower for large N.

30. The product of manufacture of claim 21, wherein said classical computer includes a unitary matrix decomposer which is used in the calculation of said sequences of operations, wherein if said unitary matrix decomposer is given data that fairly directly specifies a unitary matrix U, then the decomposer will calculate a data-set that fairly directly specifies three unitary matrices: L, D, R, such that the following matrix equation holds: U=LDR.

31. The product of manufacture of claim 21 wherein said tree is a binary tree in which each node branches out into two nodes.

32. The product of manufacture of claim 31, wherein said classical computer includes a unitary matrix decomposer which is used in the calculation of said sequences of operations, wherein if the decomposer is given data that fairly directly specifies a unitary matrix U, then the decomposer will calculate a data-set that fairly directly specifies eight unitary matrices: $D_{00}, D_{01}, D_{10}, D_{11}$, and $L_0, L_1, R_0 R_1$, such that if one partitions said U into four blocks $U_{00}, U_{01}, U_{10}, U_{11}$, then the following four matrix equations hold: $U_{ij}=L_i D_{ij} R_j$ for i $\epsilon$Bool and j $\epsilon$Bool.

33. The product of manufacture of claim 32, wherein some of said sequences of operations comprise c-not operations.

34. The product of manufacture of claim 32, wherein some of said sequences of operations comprise qubit rotation operations.

35. The product of manufacture of claim 32, wherein some of said sequences of operations comprise qubit rotations and c-nots.

36. The product of manufacture of claim 32, wherein said sequences of operations are sequences of elementary operations.

37. The product of manufacture of claim 32, further utilizing a quantum computer, comprising the additional step of:

manipulating said quantum computer largely according to said sequence of operations.

* * * * *

UNITED STATES PATENT AND TRADEMARK OFFICE
CERTIFICATE OF CORRECTION

PATENT NO. : 6,456,994 B1
DATED : September 24, 2002
INVENTOR(S) : Tucci

It is certified that error appears in the above-identified patent and that said Letters Patent is hereby corrected as shown below:

Title page, Item [54] and Column 1, line 1,
Correct title is -- COMPILER FOR A QUANTUM COMPUTER --.

Title page,
Item [56], References Cited, OTHER PUBLICATIONS, replace "Barrenco", by
-- Barenco --.
Item [57], ABSTRACT
Line 1, replace "quantum hits" by -- quantum bits --.
Line 2, replace "hard-ware" by -- hardware --.
Line 6, replace "Computer" by -- computer --.

Column 1,
Line 2, insert -- REFERENCE TO A MICROFICHE APPENDIX
The present application includes a microfiche appendix comprising the C++ source code of a fully functional computer program called Qubiter1.0. Qubiter1.0 is a possible embodiment of the software of the present invention. The microfiche appendix comprises 1 microfiche with a total of 52 frames. The first frame is a test pattern for focusing. The second frame, called Appendix A, is a list of files contained in a CodeWarrior$^{TM}$ project for Qubiter1.0. Subsequent frames are labelled Appendix B, and comprise source code contained within said files. --.
Line 13, replace "sonic" by -- some --.
Line 62, replace period after the word "equivalently" by a comma.

Column 2,
Line 12, delete parenthesis in front of -- quantum --.
Line 61, delete parenthesis in front of -- quantum --.

Column 3,
Line 26, replace "k where" by -- where --.

Column 4,
Line 55, replace "$K_{|S|}$" by -- $k_{|S|}$ --.

Line 59, replace "$(\hat{x}.)Z_{1,N}$" by -- $(\hat{x}.)z_{1,N}$ --.

Line 62, replace "$(x.)Z_{1,4}$" by "$(x.)z_{1,4}$" and "$(\hat{x}.)Z_{1,4}$" by --$(\hat{x}.)z_{1,4}$--.

Column 5,
Line 3, replace "$(x.)Z_{int}$" by "$(x.)z_{int}$".

Line 4, replace "$(x.)Z_{ext}$" by "$(x.)z_{ext}$".

UNITED STATES PATENT AND TRADEMARK OFFICE
CERTIFICATE OF CORRECTION

PATENT NO. : 6,456,994 B1
DATED : September 24, 2002
INVENTOR(S) : Tucci

It is certified that error appears in the above-identified patent and that said Letters Patent is hereby corrected as shown below:

Column 6,
Line 15, replace "FIG. 9" by -- FIG. 2 --.
Line 25, replace "$(x.)\Gamma_a$" by "$(x.)_{\Gamma_a}$".

Column 7,
Line 29, replace "$Ba$" by -- $B_a$ --.

Column 8,
Equation 14, replace "$a_{max}(J)$" by -- $a_{max}(j)$ --.
Line 30, replace "$M_1$" by -- $M$ --.

Line 31, replace "$(x.)Z_{ext}$" by "$(x.)_{Z_{ext}}$".

Lines 49 and 50, replace ".The subscript was mistyped" by a comma.

Line 61, replace "$m_{a_0}$" by "$M_{a_0}$" and "$M_{a-1}$" by "$M_{a_0-1}$".

Column 9,
Line 7, replace "$da$" by -- $d_a$ --.
Line 18, replace "vet" by -- yet --.
Line 30, replace "will will" by -- will --.
Line 39, replace "one call use" by -- one can use --.

Column 10,
Line 15, replace "Ve" by -- We --.

Column 12,
Equation 35, replace "$(x)P_a(x)P_b$" by -- $(\times)P_a(\times)P_b$ --.

Line 33, replace "$\vec{b}$" by "$\vec{\theta}$".

Equation 36, replace "$A$" in denominator by -- 4 --.
Equation 38a, replace "((" by -- ( --.
Equation 39, replace "$(x)$" by -- $(\times)$ --.

Column 13,
Equation 44, The $\theta$ at the end of the line and the $\vec{b}$ that starts the next line should not have been split. Joined they read $\theta_{\vec{b}}$.

Line 28, replace "$A\vec{b}$" by "$A_{\vec{b}}$".

UNITED STATES PATENT AND TRADEMARK OFFICE
CERTIFICATE OF CORRECTION

PATENT NO. : 6,456,994 B1
DATED : September 24, 2002
INVENTOR(S) : Tucci

It is certified that error appears in the above-identified patent and that said Letters Patent is hereby corrected as shown below:

Column 14,
Equation 52c, insert -- ) -- immediately after $\sigma_z$.

Line 26, replace "$\phi\vec{a}$" by "$\phi_{\vec{a}}$".
Line 57, replace "$A\vec{b}$" by "$A_{\vec{b}}$".

Line 66, Delete comma after "but".

Column 15,
Line 6, immediately after the sentence that ends: "... (a SEO) to a quantum computer", insert the following sentences: -- By a classical computer, we mean a device that makes a desired calculation using digital circuits which implement deterministic (classical, non-quantum) logic. By a quantum computer we mean a device that makes a desired calculation using an array of quantum bits (qubits). Besides their calculational circuits, classical and quantum computers may comprise input, output and memory devices. The important difference is that an array of quantum bits may be put in an entangled quantum state, whereas a digital deterministic logic circuit cannot be put in such a state (in practice, for useful periods of time). --
Line 7, replace "The classical computer is a Mac computer" by -- The classical computer of our preferred embodiment is a Mac computer --.
Line 22, replace "A preferred embodiment of the invention was written" by -- Software for a preferred embodiment of the invention was written --
Line 23, insert period immediately after "CodeWarrior$^{TM}$".
Line 25, immediately after "...Austin, Texas." insert the following explanatory sentences: -- C++ source code for a computer program called "Qubiterl.0" is included as a Microfiche Appendix to this document. The Microfiche Appendix has two parts: Appendix A and Appendix B. --
Line 35, replace "many hits" by -- many bits --.
Line 58, replace "CNOT a" by -- CNOT $\alpha$ --.
Line 61, replace "Read if" by -- Read it as --.
Line 62, replace "$\sigma_x(\beta)^{\bar{n}}(\alpha)$" by "$\sigma_x(\beta)^{\bar{n}(\alpha)}$".

Column 17,
Line 21, delete the word "speed".
Line 27, replace "Operators" by -- operators --.
Lines 40-46, replace "A product of manufacture comprised of a computer readable medium and thereon stored a method of operating a classical computer to calculate" by -- A method of operating a classical computer, wherein said method must be stored in a computer readable medium which said classical computer can read, to calculate --
Line 50, replace "a label for each node" by -- a node label for each node --
Line 54, replace "said label pair" by -- the label pair --

UNITED STATES PATENT AND TRADEMARK OFFICE
CERTIFICATE OF CORRECTION

PATENT NO. : 6,456,994 B1
DATED : September 24, 2002
INVENTOR(S) : Tucci

It is certified that error appears in the above-identified patent and that said Letters Patent is hereby corrected as shown below:

Column 18,
Line 39, replace: "said sequences of operations" by -- said sequence of operations --
Line 47, replace: "said sequences of operations" by -- said sequence of operations --
Line 63, replace: "A product of manufacture comprised of a computer readable medium and thereon stored a method of operating a classical computer having display, storage and calculation means, to analyze" by -- A method of operating a classical computer having display, storage and calculation means , wherein said method must be stored in a computer readable medium which said classical computer can read, to analyze --

Column 19,
Line 6, replace: "a label for each" by -- a node label for each --
Line 60, replace: "said sequences of operations" by -- said sequence of operations --

Column 19, lines 49-67-Column 20, lines 1-8,
Replace: "The product of manufacture of" by -- The method of --

Column 20,
Line 8: Replace "$U_{ij}32$" by -- $U_{iJ}$ --
Lines 17-20, replace: "A product of manufacture comprised of a computer readable medium and thereon stored a method of operating a classical computer to calculate" by -- A method of operating a classical computer, wherein said method must be stored in a computer readable medium which said classical computer can read, to calculate --
Line 25, replace: "a unitary matrix $U$" by -- a unitary matrix $U$ of dimension greater than 2 --
Line 28, replace: "$U = LDR$" by -- $U = LDR$, wherein L and R each yields unitary matrices whose dimension is smaller than that of $U$ --
Line 36, replace: "a sequence of operations" by -- said sequence of operations --
Line 43, replace: "a unitary matrix $U$" by -- a unitary matrix $U$ of dimension greater than 2 --
Line 44, Replace "specifics" by -- specifies --.
Lines 41-56, replace: "The product of manufacture of" by -- The method of --

Column 20, lines 61-67 - Column 21, lines 1-17,
Replace: "A product of manufacture comprised of a computer readable medium and thereon stored a method of operating a classical computer to calculate" by -- A method of operating a classical computer, wherein said method must be stored in a computer readable medium which said classical computer can read, to calculate --

UNITED STATES PATENT AND TRADEMARK OFFICE
CERTIFICATE OF CORRECTION

PATENT NO. : 6,456,994 B1
DATED : September 24, 2002
INVENTOR(S) : Tucci

It is certified that error appears in the above-identified patent and that said Letters Patent is hereby corrected as shown below:

Column 21,
Line 8, replace: "can he represented" by -- can be represented --
Lines 14 and 15, replace: "sequence of operations" by -- string of operations -- at the two places in lines 14 and 15 where it occurs.

Column 21, lines 18-43 - Column 22, lines 1-42,
Replace: "The product of manufacture of" by -- The method of --

Column 22,
Line 4, insert a comma immediately before the phrase: "for large $N$".
Line 21, replace "$R_0R_1$" by -- $R_0, R_1$ --

Signed and Sealed this

Tenth Day of February, 2004

JON W. DUDAS
*Acting Director of the United States Patent and Trademark Office*